June 16, 1931. R. A. WALTER 1,810,804
TROUGH CONNECTION FOR RECIPROCATING CONVEYERS
Filed June 22, 1926  2 Sheets-Sheet 1
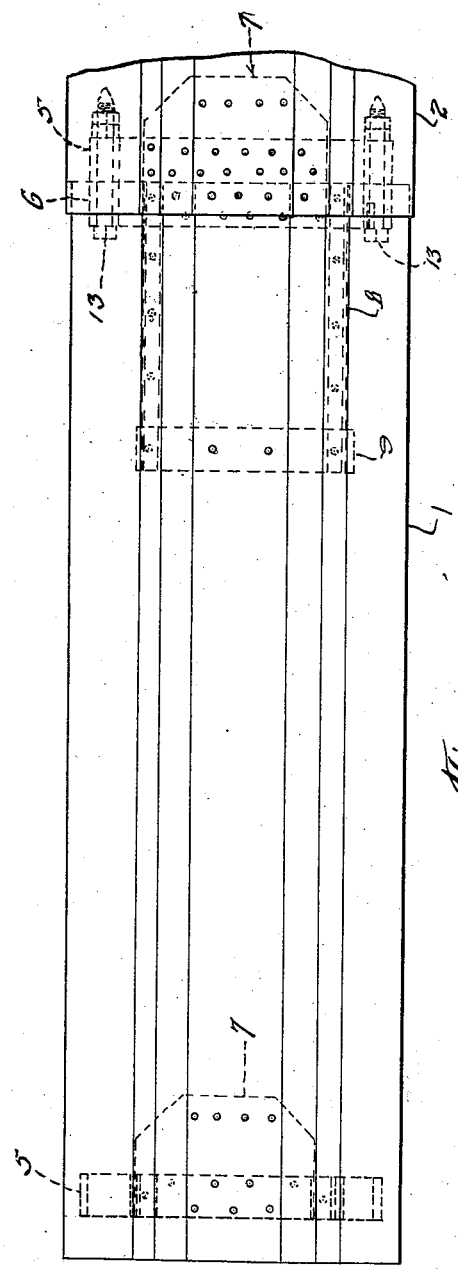
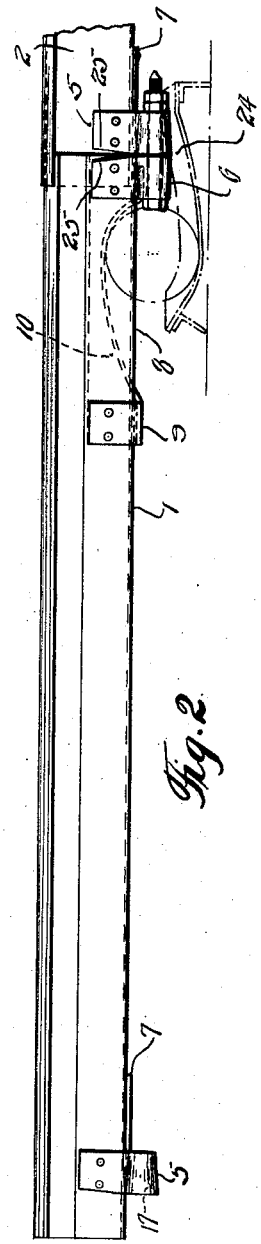
INVENTOR
RAYMOND A. WALTER
BY
Semmes & Semmes
ATTORNEYS June 16, 1931. R. A. WALTER 1,810,804
TROUGH CONNECTION FOR RECIPROCATING CONVEYERS
Filed June 22, 1926 2 Sheets-Sheet 2
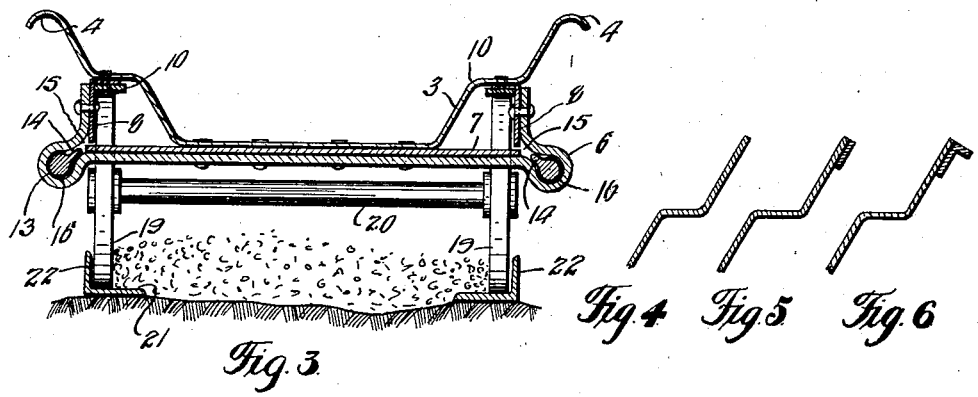

Patented June 16, 1931

1,810,804

UNITED STATES PATENT OFFICE

RAYMOND A. WALTER, OF NEW YORK, N. Y., ASSIGNOR TO CONVEYOR SALES COMPANY, OF NEW YORK, N. Y., A CORPORATION OF NEW YORK

TROUGH CONNECTION FOR RECIPROCATING CONVEYERS

Application filed June 22, 1926. Serial No. 117,827.

This invention relates in general to attaching devices and more particularly has reference to a construction for connecting the ends of adjacent reciprocating conveyer troughs.

Previous to this time the ends of adjacent reciprocating conveyer troughs have usually been rigidly connected. It is manifest that in a coupling lacking in flexibility that tearing is liable to occur by reason of the stresses and strains set up by a conveyer in operation. The rigid connections heretofore employed have further generally been of such complicated structure, in the inclusion of a multiplicity of connectors, as to preclude the easy assembly and disconnection, that is desirable, if not essential, in reciprocating conveyer structures.

An object of this invention is to provide reciprocating conveyer troughs so constructed that flexible coupling of the same may be readily accomplished, and disconnection of the troughs achieved with like facility.

Another object of this invention is to provide troughs for a conveyer so formed with integrally reinforced flanges.

Still another object of this invention is to provide a connection for reciprocating conveyer troughs adapted to allow movement therebetween to the extent necessary for efficient conveyer operation.

A further object of this invention is to provide a track for a reciprocating conveyer mechanism that will prevent the lodgment of foreign material on the mechanism, and thereby render the conveyer more efficient after periods of extended use.

This invention consists in general of an improved reinforcement for the edges of a conveyer trough constructed integral therewith, accomplished by rounding said edges. The adjacent sections of the conveyer troughs are adapted to be connected by a metallic gusset plate possessing greater tensile strength than the troughs to permit the distribution of any undue stresses or loads over a wider area, and secured by a steel band riveted across the bottom of the trough and also to an angle, which is in turn riveted to the trough and to an additional steel band, also riveted to the trough. The bands are further riveted to an upper and lower track designed to give greater strength to the connection. The troughs, the gusset plate, and the steel band are further secured to one another by counter-sunk holes having their peripheral edges compressed one into the other and held by rivets in the holes. The connecting bolts and the receiving apertures therefor have been tapered to facilitate the insertion thereof. The track carrying the rollers operating the conveyer have been provided with integral flanges; it will be appreciated that by this structure deposition of material on the bearing surface is precluded.

In the event of the conveyer being installed on uneven surfaces, the provision of bands having inclined upturned ends has been made to permit relative vertical movement therebetween to relieve undue strains. This construction allows the bands to be drawn tightly together, although the adjacent troughs do not lie in the same horizontal plane.

With these and other objects in view which may be incident to my improvements, the invention consists in the parts and combinations to be hereinafter set forth and claimed, with the understanding that the several necessary elements comprising my invention, may be varied in construction, proportions and arrangement, without departing from the spirit and scope of the appended claims.

In order to make my invention more clearly understood, I have shown in the accompanying drawings means for carrying the same into practical effect, without limiting the improvements in their useful applications to the particular constructions, which for the purpose of explanation, have been made the subject of illustration.

In the drawings forming a part of this specification:

Figure 1 is a top plan view showing the method of connecting reciprocating conveyor trough units;

Fig. 2 is a side elevational view of the matter shown in Figure 1;

Fig. 3 is a front elevation sectional view showing means of connecting the adjacent trough sections;

Fig. 4 is a front elevation sectional view of a side of a conveyer trough having no reinforcement on the edges;

Fig. 5 is a front elevation sectional view of the side of a conveyer trough having a reinforced edge;

Fig. 6 is a front elevation sectional view of the side of a conveyer trough having the edge reinforced by an angle iron;

Fig. 7 is a front elevation sectional view of the improved track designed to support the reciprocating mechanism;

Fig. 8 is a side elevational view of the matter shown in Figure 7;

Fig. 9 is a top plan view of the matter shown in Figures 7 and 8;

Fig. 10 is a side elevational view of the reciprocating mechanism shown in engagement with the trough;

Fig. 11 is a side elevational view of the improved lock bolt shown having a shoulder on the shank;

Fig. 12 is a side elevation plan view showing the improved inclined connector bands attached to adjacent conveyer troughs;

Fig. 13 is a side elevation sectional view of the improved manner of riveting together adjacent conveyer trough sections;

Fig. 14 is a side elevation sectional view showing the old manner of riveting together adjacent conveyer trough sections;

Fig. 15 is a side elevation sectional view of the old manner of securing adjacent conveyer trough sections.

Referring by numerals to the drawings, in Figures 1 and 2 adjacent conveyer trough units are designated by the numerals 1 and 2. According to the preferred embodiment of my invention a novel connection means is afforded, better shown in Figure 3, comprising a conveyer trough 3 having rounded edges 4 affording greater strength than by the old method of attaching reinforcement members. The ends of each adjacent trough are reinforced by a gusset plate 7 constructed of a metal having a greater tensile strength than the troughs to permit the distribution of any undue stresses or loads over a wide area. This plate 7 is further secured on the end of each trough by a steel band 5 riveted to the side walls of each trough.

At the end of each trough is riveted a steel band 6 across the bottom, which is also riveted to an angle 8, which angle is riveted to the end of each trough and to a band 9 likewise riveted to each trough. There is also riveted to the upper track 10, bands 6 and 9 adapted to add strength to the connection.

A novel means for fixing the connections by rivets is afforded having reference to Figure 13. A hole is countersunk in the band 12. An ordinary hole is bored in the gusset plate 7 and the peripheral edge pressed around this hole so as to fit in the countersinking of the hole in the band 12. In a like manner holes are formed in the metal trough 11 and pressed to fit into the countersinking of the gusset plate 7. In the common aperture of the trough, the gusset plate and the band is secured by a rivet which, it will be seen, has a much greater purchase on the metal trough 11 than by the old method, as shown in Figure 14. Also the metal trough is given a strong purchase on the depressed section of the gusset plate 7 and the metal of the gusset plate 7 is in turn given a grip on the band 12.

An improved bolt 13, as shown in Figure 11, is adapted to serve as a connecting member for the adjacent conveyer troughs. Heretofore it has been necessary for the workman performing the operation to hold the head 13 of the bolt from turning with a wrench while nuts on the bolts were tightened, one against the other. In the improved bolt the shoulder 14 is provided adapted to fit in a recess 15 in the bands 5 and 6, shown in Figure 3, thus preventing the bolt from turning and permitting the operator use of both hands allowing him to obtain a greater speed. The holes 16 are tapered as are the bolts 13, allowing a greater facility in the insertion of the bolts, as seen at 17 in Figures 2 and 12. A longer taper 18 is put on the end of the bolt, as shown in Figure 11, thus allowing greater rapidity and facility in inserting the bolt 13, even though the holes in the adjacent band do not match closely.

The conveyer is adapted to roll back and forth on the rollers 19 connected by axle 20, resting on and rolling back and forth on an angle iron track 21, with flanges 22 pressed outside the wheels as shown in the cross sectional view Figure 3. Dirt or foreign matter has been wont to collect between the rollers 19 and prevented from falling away by the flanges 22, causing friction and great power loss.

This construction has been improved by placing the flanges 22 inside the rollers 19 as shown in Figures 7, 8 and 9. By this construction a considerable quantity of dirt or foreign matter may accumulate underneath the conveyer before retarding the action of the rollers, as it is prevented from reaching that part of the mechanism by the flanges 22. In the event of the refuse eventually piling up to such a height that it flows over the flanges 22, thereby interfering with the operation of the rollers 19, it may readily fall away from the angle track 21. The ends of the bands 5 and 6 adjoining the adjacent troughs are provided with inclined upturned ends, as shown at 25, thus permitting the connecting ears of the plates 5 and 6 to be drawn tightly together by bolts 13, even though the adjacent troughs do not lie in the same horizontal plane. In this manner vertical extension of the troughs is provided and an open space at the point 24 made by the old type of connection is done away with.

There is accomplished by this invention an improved conveyer trough mechanism having a strengthened connector element allowing rapid assembly or dismantling and so constructed as to allow relative vertical movement between the adjacent troughs. An improved track is provided adapted to protect the conveyer mechanism from the deposition of any foreign material apt to retard the efficiency of operation. The conveyer trough has further been improved by the provision of a reinforcement on the edges integral with the trough.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

I claim:

1. A connection for conveyer troughs comprising a plurality of bands attached to the troughs one band being attached flush with the end of one trough and the other band back from the end of the adjacent trough to allow overlapping thereof, the sides of the bands being formed to provide frusto conical apertures to receive bolts, the bolts having longitudinally extending feathers adapted to fit in the open portions of the bands on the peripheries of the apertures to prevent rotative movement of the bolts with respect thereto, the adjacent edges of the bands being cut away to allow relative pivotal movement between the troughs.

2. A connection for conveyer troughs comprising registering eyelets provided on the sides of the troughs adjacent the ends, the eyelets being formed to allow pivotal movement with respect to each other and provided with longitudinal slots, and bolts having tapered ends and longitudinal feathers fitted in the eyelets, the tapered ends of the bolts being adapted to facilitate insertion thereof, and the feathers being adapted to fit in the slots in the eyelets to prevent rotation of the bolts with respect thereto.

In testimony whereof I affix my signature.

RAYMOND A. WALTER.